United States Patent
Umehara et al.

(10) Patent No.: US 12,305,089 B2
(45) Date of Patent: May 20, 2025

(54) SEALING METHOD

(71) Applicant: FUJIFILM Corporation, Tokyo (JP)

(72) Inventors: Takeshi Umehara, Minamiashigara (JP); Tetsuro Mitsui, Minamiashigara (JP); Miyoko Hara, Minamiashigara (JP); Kana Sasahara, Minamiashigara (JP); Akio Tamura, Minamiashigara (JP); Reiko Inushima, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 236 days.

(21) Appl. No.: 18/063,483

(22) Filed: Dec. 8, 2022

(65) Prior Publication Data

US 2023/0109172 A1    Apr. 6, 2023

Related U.S. Application Data

(63) Continuation of application No. PCT/JP2021/021886, filed on Jun. 9, 2021.

(30) Foreign Application Priority Data

Jun. 12, 2020 (JP) .................. 2020-102250
Jul. 7, 2020 (JP) .................. 2020-117053

(51) Int. Cl.
  C09J 7/30      (2018.01)
  C03C 27/04    (2006.01)
  C09J 5/00      (2006.01)
  C09J 11/06    (2006.01)

(52) U.S. Cl.
  CPC .............. *C09J 7/30* (2018.01); *C03C 27/048* (2013.01); *C09J 5/00* (2013.01); *C09J 11/06* (2013.01); *C09J 2301/408* (2020.08); *C09J 2301/414* (2020.08); *C09J 2400/146* (2013.01); *C09J 2401/006* (2013.01); *C09J 2433/00* (2013.01)

(58) Field of Classification Search
  CPC ........ C09J 7/30; C09J 11/06; C09J 2401/006; C09J 2433/00; C03C 27/048
  See application file for complete search history.

(56) References Cited

U.S. PATENT DOCUMENTS

2002/0114934 A1    8/2002  Liu et al.
2018/0208805 A1*   7/2018  Mieda .................. C09J 135/02

FOREIGN PATENT DOCUMENTS

| CN | 105068353 A   |   | 11/2015 |
| JP | 1-203940 A    |   | 8/1989  |
| JP | 5-13577 B2    |   | 2/1993  |
| JP | 5-101884 A    |   | 4/1993  |
| JP | 8-105827 A    |   | 4/1996  |
| JP | 11101943 A    | * | 4/1999  |
| JP | 2004-506228 A |   | 2/2004  |
| JP | 2010-182556 A |   | 8/2010  |
| KR | 10-0932049 B1 |   | 12/2009 |

OTHER PUBLICATIONS

Extended European Search Report issued Oct. 11, 2023 in Application No. 21823054.8.
International Search Report dated Aug. 17, 2021 in Application No. PCT/JP2021/021886.
Written Opinion of the International Searching Authority dated Aug. 17, 2021 in Application No. PCT/JP2021/021886.
International Preliminary Report on Patentability dated Dec. 13, 2022 with a Translation of the Written Opinion of the International Searching Authority in Application No. PCT/JP2021/021886.

* cited by examiner

*Primary Examiner* — Daniel McNally
(74) *Attorney, Agent, or Firm* — Sughrue Mion, PLLC

(57) ABSTRACT

An object of the present invention is to provide a sealing method using a cover film where a problem of odor is not likely to occur and quick drying properties and sealability are high.

The sealing method according to the present invention is a sealing method that is performed using at least a cover film and a sealing solvent, the cover film including a polymer layer provided on a transparent support, in which the sealing solvent is a solvent including at least one kind selected from the group consisting of an ester, an alcohol, a ketone, an ether, and an aromatic hydrocarbon, in a case where the sealing solvent is an ester, an alcohol, a ketone, or an ether, a boiling point of the sealing solvent is 80° C. to 170° C., and in a case where the sealing solvent is an aromatic hydrocarbon, a boiling point of the sealing solvent is 150° C. to 170° C.

12 Claims, No Drawings

SEALING METHOD

CROSS-REFERENCE TO RELATED APPLICATIONS

This application is a Continuation of PCT International Application No. PCT/JP2021/021886 filed on Jun. 9, 2021, which claims priority under 35 U.S.C. § 119(a) to Japanese Patent Application No. 2020-102250 filed on Jun. 12, 2020 and Japanese Patent Application No. 2020-117053 filed on Jul. 7, 2020. The above applications are hereby expressly incorporated by reference, in its entirety, into the present application.

BACKGROUND OF THE INVENTION

1. Field of the Invention

The present invention relates to a sealing method using a cover film.

2. Description of the Related Art

A method is known in which a microscopic sample is prepared by applying an adhesive to a transparent support in advance to prepare a cover film and automatically laminating and bonding (hereinafter, referred to as "sealing") the cover film on a glass slide to which several droplets of an organic solvent where the adhesive can swell or is soluble are added dropwise and a subject is placed.

JP2004-506228A describes a cover film having transparency, the same refractive index as that of a glass slide, a rapid interaction with an activation solvent, compatibility with a coloring chemical used for a sample, and long-term stability under a high-temperature and high-humidity condition, and describes limonene in addition to xylene as a sealing solvent. However, the sealing solvent other than xylene has poor affinity to an adhesive such that sealability deteriorates.

In addition, JP1999-101943A (JP-H11-101943A) describes a cover film for a microscope that is suitable for automatic sealing. In the cover film, even in a case where the cover film is stored in a roll shape, blocking between an adhesive layer and a support back surface does not occur, and even in a case where the cover glass is bonded to a glass slide to seal a sample and is stored for a long period of time, peeling of the film by a change over time does not occur. As the sealing solvent, in addition xylene, toluene, ethyl acetate, methyl acetate, acetone, and methyl ethyl ketone are described. However, all of the solvents other than xylene are difficult to handle from the viewpoints of a low boiling point and strong odor, and thus have poor general-purpose properties.

SUMMARY OF THE INVENTION

During sealing using the cover film, generally, xylene is widely used as the sealing solvent where an adhesive is soluble. However, from the viewpoint of odor, there are needs for using another solvent instead of xylene. Instead of xylene, pinene, limonene, and alkane-based solvents are used in many cases. These solvents are more favorable than xylene from the viewpoint of odor but often have low solubility in the adhesive of the cover film. As a result, there may be a case where a sample cannot be sealed or quick drying properties after sealing are poor. In addition, even in a case where a sample can be sealed, there is a problem in that peeling occurs over time due to poor adhesiveness.

An object of the present invention is to provide a sealing method using a cover film where a problem of odor is not likely to occur and quick drying properties and sealability are high.

As a result of a thorough investigation to achieve the object, the present inventors found that the object can be achieved by the following configurations.

[1] A sealing method that is performed using at least a cover film and a sealing solvent, the cover film including a polymer layer provided on a transparent support,
in which the sealing solvent is a solvent including at least one kind selected from the group consisting of an ester, an alcohol, a ketone, an ether, and an aromatic hydrocarbon,
in a case where the sealing solvent is an ester, an alcohol, a ketone, or an ether, a boiling point of the sealing solvent is 80° C. to 170° C., and
in a case where the sealing solvent is an aromatic hydrocarbon, a boiling point of the sealing solvent is 150° C. to 170° C.

[2] The sealing method according to [1],
in which a hydrogen bond element $dH_1$ in a Hansen solubility parameter of the sealing solvent is 2.5 to 15.0, and
a polarity element $dP_1$ in the Hansen solubility parameter of the sealing solvent is 0.5 to 8.0.

[3] The sealing method according to [1] or [2],
in which the sealing solvent includes at least one selected from the group consisting of ethyl propionate, amyl acetate, propyl acetate, isopropyl acetate, butyl acetate, methyl lactate, dimethyl carbonate, 1-butanol, 1-propanol, 2-butanol, 1-pentanol, 2-pentanol, isoamyl alcohol, t-amyl alcohol, neopentyl alcohol, cyclopentanol, 2-hexanol, 4-methyl-2-pentanol, methyl isobutyl ketone, acetylacetone, cyclopentanone, n-butyl ether, 1,2-dimethoxyethane, dioxane, cyclopentyl methyl ether, 1-methoxy-2-propanol, 2-methoxy-1-methylethyl acetate, and 1,3,5-trimethylbenzene.

[4] The sealing method according to any one of [1] to [3],
in which a polymer in the polymer layer includes a repeating unit derived from at least one monomer selected from the group consisting of ethyl acrylate, n-butyl acrylate, methyl acrylate, cyclohexyl acrylate, benzyl acrylate, ethyl methacrylate, n-butyl methacrylate, isobutyl methacrylate, t-butyl methacrylate, methyl methacrylate, cyclohexyl methacrylate, benzyl methacrylate, acetoacetoxy alkyl methacrylate, styrene, and dimethylacrylamide.

[5] The sealing method according to [4],
in which the polymer in the polymer layer consists of a repeating unit derived from at least one monomer selected from the group consisting of ethyl acrylate, n-butyl acrylate, methyl acrylate, cyclohexyl acrylate, benzyl acrylate, ethyl methacrylate, n-butyl methacrylate, isobutyl methacrylate, t-butyl methacrylate, methyl methacrylate, cyclohexyl methacrylate, benzyl methacrylate, acetoacetoxy alkyl methacrylate, styrene, and dimethylacrylamide.

[6] The sealing method according to any one of [1] to [5],
in which a hydrogen bond element $dH_2$ in a Hansen solubility parameter of a polymer in the polymer layer is 2.5 to 7.0, and
a polarity element $dP_2$ in the Hansen solubility parameter of the polymer in the polymer layer is 2.5 to 7.0.

[7] The sealing method according to any one of [1] to [6],
in which a refractive index of the transparent support is 1.460 to 1.560.

[8] The sealing method according to any one of [1] to [7],
in which a material for forming the transparent support is triacetate cellulose.

[9] The sealing method according to any one of [1] to [8], in which a thickness of the transparent support is 50 to 150 µm.

[10] The sealing method according to any one of [1] to [9], in which a total film thickness of the polymer layer and the transparent support is 150 µm or less.

[11] The sealing method according to any one of [1] to [10], in which the polymer layer includes a silane coupling agent.

[12] The sealing method according to [11], in which the silane coupling agent is selected from γ-glycidoxypropyltrimethoxysilane or N-β-(aminoethyl)-γ-aminopropyl methyldimethoxysilane.

[13] The sealing method according to any one of [1] to [12], in which a distance D in Hansen space is 8.0 or less, the distance D being calculated using Expression (1) from a hydrogen bond element $dH_1$ and a polarity element $dP_1$ in a Hansen solubility parameter of the sealing solvent and a hydrogen bond element $dH_2$ and a polarity element $dP_2$ in a Hansen solubility parameter of a polymer in the polymer layer, $$D=\{(dH_1-dH_2)^2+(dP_1-dP_2)_2\}^{1/2} \quad (1).$$

According to an aspect of the present invention, it is possible to provide a sealing method using a cover film where a problem of odor is not likely to occur and quick drying properties and sealability are high.

DESCRIPTION OF THE PREFERRED EMBODIMENTS

Hereinafter, the details of the present invention will be described.

The description regarding configuration requirements according to an embodiment of the present invention has been made based on a representative embodiment of the present invention. However, the present invention is not limited to the embodiment.

In the present specification, numerical ranges represented by "to" include numerical values before and after "to" as minimum values and maximum values.

Regarding numerical ranges that are described stepwise in the present specification, an upper limit value or a lower limit value described in a numerical range may be replaced with an upper limit value or a lower limit value of another stepwise numerical range. In addition, regarding a numerical range described in the present specification, an upper limit value or a lower limit value described in a numerical range may be replaced with a value described in Examples.

In the present specification, "mass %" has the same definition as "wt %", and "part(s) by mass" has the same definition as "part(s) by weight".

In the present specification, a combination of two or more preferred aspects is a more preferable aspect.

In addition, in the present specification, in a case where a plurality of materials corresponding to each of components in a composition or a layer are present, the amount of the component in the composition represents the total amount of the plurality of materials present in the composition unless specified otherwise.

In the present specification, unless specified otherwise, a refractive index refers to a value that is measured using an Abbe refractometer ("NAR-2T", manufactured by Atago Co., Ltd.) with respect to light having a wavelength of 550 nm.

In a sealing method according to an embodiment of the present invention (hereinafter, simply referred to as "sealing method"), a sample is sealed using a cover film and a specific sealing solvent, the cover film including a transparent support and a polymer layer formed on a surface of the transparent support.

As a result of a thorough investigation, the present inventors found that, in a sealing method in which a sample is sealed using a film with an adhesive polymer and a sealing solvent, as long as a solvent including at least one kind selected from the group consisting of an ester, an alcohol, a ketone, an ether, and an aromatic hydrocarbon is used as the sealing solvent, odor is not likely to occur and quick drying properties and sealability are higher even without using xylene (the formation of bubbles and the peeling of the cover film are not likely to occur, and thus a sample can be preferably sealed).

Specific examples of the sealing method include a method of laminating a cover film including a transparent support and a polymer layer on a surface of a substrate (for example, a glass slide) on which a subject is placed to bond the substrate and the cover film to each other. In this case, a sealing solvent is disposed between the substrate and the cover film, and the substrate and the cover film are laminated such that a surface of the cover film on the polymer layer side faces the substrate. As a result, the laminate for use in a microscopic sample is prepared.

In the sealing method, a method of disposing the sealing solvent between the substrate and the cover film is not particularly limited, and a method of adding the sealing solvent dropwise to the surface of the substrate on which a subject to be sealed is placed is preferable. In addition, after dipping the substrate on which the subject is placed in the sealing solvent in advance, the sealing solvent may be further added dropwise to the surface of the substrate. In this case, the sealing solvent in which the substrate is dipped and the sealing solvent that is added dropwise to the substrate after dipping may be the same as or different from each other.

The sealing method may be automated sealing using a well-known automatic sealing machine.

[Sealing Solvent]

In the present specification, the sealing solvent refers to solvent in which a polymer (hereinafter, also referred to as "adhesive polymer") in the polymer layer of the cover film is miscible or soluble.

In the sealing method according to the embodiment of the present invention, in a case where the sealing solvent is an ester, an alcohol, a ketone, or an ether, a solvent having a boiling point in a range of 80° C. to 170° C. is used, and in a case where the sealing solvent is an aromatic hydrocarbon, a solvent having a boiling point in a range of 150° C. to 170° C. is used. In other words, the sealing solvent used in the sealing method according to the embodiment of the present invention includes at least one solvent (hereinafter, also referred to as "specific solvent") selected from the group consisting of an ester having a boiling point of 80° C. to 170° C., an alcohol having a boiling point of 80° C. to 170° C., a ketone having a boiling point of 80° C. to 170° C., an ether having a boiling point of 80° C. to 170° C., and an aromatic hydrocarbon having a boiling point of 150° C. to 170° C.

Regarding the ester, the alcohol, the ketone, and the ether, by setting the boiling point of the sealing solvent to be 80° C. or higher, the volatility of the solvent is low, and odor can be further suppressed. In addition, regarding the aromatic hydrocarbon, by setting the boiling point of the sealing solvent to be 150° C. or higher, odor can be suppressed. On the other hand, by setting the boiling point of the sealing solvent to be 170° C. or lower, the solvent can be quickly dried after sealing, the period of time required for observation can be reduced, and quick drying properties are higher.

In the sealing method, in a case where the solubility of the adhesive polymer in the sealing solvent is high, higher sealability is exhibited, which is preferable. As a result of a thorough investigation, it was found that, in a case where a hydrogen bond element and a polarity element in a Hansen solubility parameter (HSP value) of the sealing solvent are represented by $dH_1$ and $dP_1$, respectively, the hydrogen bond element $dH_1$ is in a range of 0.1 to 16.0, preferably 1.5 to 15.5, and more preferably 2.5 to 15.0, and the polarity element $dP_1$ is in a range of 0.1 to 12.0, preferably 0.3 to 12.0, and more preferably 0.5 to 8.0, and thus sealability is high.

The HSP value can be calculated with the Y-MB method using HSPiP (ver. 5).

In a case where a mixed solvent including two or more solvents is used as the sealing solvent, a centroid in Hansen space is calculated from the HSP value and the mass content of each of the solvents, and a hydrogen bond element dH and a polarity element dP in the HSP value of the obtained centroid are used as the hydrogen bond element $dH_1$ and a polarity element $dP_1$ in the HSP value of the mixed solvent.

The sealing solvent is not particularly limited as long as it satisfies the above-described requirements. As the sealing solvent, only one specific solvent may be used, or a combination of two or more specific solvents may be used.

The content of the specific solvent in the sealing solvent is preferably 30 mass % or more and more preferably 50 mass % or more with respect to the total mass of the sealing solvent. The upper limit is not particularly limited and may be 100 mass % with respect to the total mass of the sealing solvent.

From the viewpoints of the odor and the sealability (encapsulability), it is preferable that the sealing solvent includes at least one selected from the group consisting of: ethyl propionate, amyl acetate, propyl acetate, isopropyl acetate, butyl acetate, methyl lactate, and dimethyl carbonate (all of which are esters); 1-butanol, 1-propanol, 2-butanol, 1-pentanol, 2-pentanol, isoamyl alcohol, t-amyl alcohol, neopentyl alcohol, cyclopentanol, 2-hexanol, and 4-methyl-2-pentanol (all of which are alcohols); methyl isobutyl ketone, acetylacetone, and cyclopentanone (all of which are ketones); n-butyl ether, 1,2-dimethoxyethane, dioxane, cyclopentyl methyl ether, 1-methoxy-2-propanol, and 2-methoxy-1-methylethyl acetate, (all of which are ethers); and 1,3,5-trimethylbenzene (which is an aromatic hydrocarbon), and it is more preferable that the sealing solvent includes only one solvent selected from the group alone or is a combination of two or more solvents selected from the group.

Hereinafter, the cover film that is used in the sealing method and includes the adhesive polymer layer formed on the transparent support will be described.

[Transparent Support]

The transparent support in the cover film is not particularly limited, and all of well-known transparent supports can be used.

In the present specification, "transparent" represents that a transmittance with respect to visible light (wavelength: 380 to 780 nm) is 60% or more. The transmittance refers to a ratio of transmitted light to incidence light into the support.

Examples of a material for forming the transparent support include a cellulose polymer such as triacetate cellulose (TAC) or diacetate cellulose, polyethylene terephthalate (PET), polycarbonate (PC), and polystyrene. Among these, a cellulose polymer or polyethylene terephthalate (PET) is preferable, and triacetate cellulose (TAC) is more preferable.

The thickness of the transparent support is preferably 50 to 250 μm, more preferably 50 to 150 μm, and still more preferably 100 to 150 μm.

In addition, the refractive index of the transparent support is not particularly limited. For example, the refractive index may be 1.440 to 1.600 and, from the viewpoint of microscopic properties, is preferably 1.460 to 1.560 that is close to to that of a glass slide (refractive index: 1.52 to 1.56).

On the surface of the transparent support, an undercoat layer that is well-known in the field of photosensitive materials may be provided. A surface treatment such as ultraviolet irradiation, corona discharge, or glow discharge may be performed on the transparent support.

[Polymer Layer]

<Polymer>

The polymer layer in the cover film includes a polymer. Hereinafter, the polymer forming the polymer layer will be described.

The polymer forming the polymer layer is a polymer that is soluble in the sealing solvent. By dissolving the polymer in the sealing solvent, the adhesiveness of the cover film with the substrate such as glass is improved. In addition, it is preferable that the polymer forming the polymer layer swells in an organic solvent used in an automatic sealing machine.

As the polymer, an acrylic resin is preferable from the viewpoint of excellent solubility in the sealing solvent.

In the present specification, the acrylic resin refers to a polymer that includes a repeating unit derived from an acrylate monomer and/or a methacrylate monomer.

The acrylic resin is not particularly limited as long as it includes a repeating unit derived from an acrylate monomer and/or a methacrylate monomer, and may be a homopolymer of one monomer selected from the group consisting of an acrylate monomer and a methacrylate monomer or may be a copolymer of two or more monomers selected from the group consisting of an acrylate monomer and a methacrylate monomer. In addition, the acrylic resin may be a copolymer of at least one monomer selected from the group consisting of an acrylate monomer and a methacrylate monomer and at least one monomer (for example, an acrylamide monomer or a vinyl monomer) other than an acrylate monomer and a methacrylate monomer.

In the acrylic resin, the content of the repeating unit derived from an acrylate monomer and/or a methacrylate monomer is preferably 50 mass % or more, more preferably 70 mass % or more, and still more preferably 90 mass % or more with respect to all of the repeating units of the acrylic resin. The upper limit of the content of the repeating unit derived from an acrylate monomer and/or a methacrylate monomer is not particularly limited and may be 100 mass % with respect to all of the repeating units of the acrylic resin.

It is still more preferable that the acrylic resin includes only the repeating unit derived from an acrylate monomer and/or a methacrylate monomer.

The acrylic resin can be prepared using a well-known method and, for example, by polymerizing at least one monomer selected from the group consisting of an acrylate monomer and a methacrylate monomer.

Examples of the acrylate monomer and the methacrylate monomer include an alkyl acrylate and an alkyl methacrylate.

The alkyl group in the alkyl acrylate and the alkyl methacrylate may further include a substituent. Examples of the substituent include an aryl group, and a phenyl group is preferable. The number of carbon atoms in the alkyl group that may have a substituent in the alkyl acrylate and the alkyl methacrylate is preferably 1 to 15, more preferably 1 to 8, still more preferably 1 to 5, and still more preferably 1 to 3.

Specific examples of the alkyl acrylate include methyl acrylate, ethyl acrylate, n-propyl acrylate, i-propyl acrylate, n-butyl acrylate, isobutyl acrylate, t-butyl acrylate, cyclohexyl acrylate, lauryl acrylate, benzyl acrylate, and acetoacetoxy alkyl acrylate.

Specific examples of the alkyl methacrylate include methyl methacrylate, ethyl methacrylate, n-propyl methacrylate, i-propyl methacrylate, n-butyl methacrylate, isobutyl methacrylate, t-butyl methacrylate, cyclohexyl methacrylate, benzyl methacrylate, lauryl methacrylate, and acetoacetoxy alkyl methacrylate.

In addition, it is preferable that the polymer forming the polymer layer is a polymer that includes a repeating unit derived from at least one monomer selected from the group consisting of alkyl acrylate, alkyl methacrylate, styrene, and acrylamide. By using this polymer, the effects can be exhibited more preferably in the sealing method.

The alkyl acrylate and the alkyl methacrylate have the same definitions as described above.

Specific examples of the monomer include ethyl acrylate, n-butyl acrylate, methyl acrylate, cyclohexyl acrylate, benzyl acrylate, ethyl methacrylate, n-butyl methacrylate, isobutyl methacrylate, t-butyl methacrylate, methyl methacrylate, cyclohexyl methacrylate, benzyl methacrylate, styrene, lauryl methacrylate, lauryl acrylate, acetoacetoxy alkyl methacrylate, acetoacetoxy alkyl acrylate, dimethylacrylamide, and isopropyl acrylamide.

In particular, as the polymer forming the polymer layer, a polymer that includes a repeating unit derived from at least one monomer selected from a group A consisting of ethyl acrylate, n-butyl acrylate, methyl acrylate, cyclohexyl acrylate, benzyl acrylate, ethyl methacrylate, n-butyl methacrylate, isobutyl methacrylate, t-butyl methacrylate, methyl methacrylate, cyclohexyl methacrylate, benzyl methacrylate, acetoacetoxy alkyl methacrylate, styrene, and dimethylacrylamide is preferable, and a polymer that includes a repeating unit derived from at least one monomer selected from a group B consisting of ethyl acrylate, methyl methacrylate, benzyl acrylate, ethyl methacrylate, n-butyl methacrylate, and cyclohexyl methacrylate is more preferable.

In particular, as the polymer forming the polymer layer, a polymer consisting of a repeating unit derived from at least one monomer selected from the group A is preferable, and a polymer consisting of a repeating unit derived from at least one monomer selected from the group B is more preferable.

In addition, from the viewpoint of optics during observation with a microscope, the refractive index of the polymer layer is preferably 1.45 to 1.56 that is close to that of glass (refractive index: 1.52 to 1.56), more preferably 1.46 to 1.56, and still more preferably 1.47 to 1.56.

From the viewpoint of easily forming the polymer layer having the above-described refractive index, it is preferable that the polymer forming the polymer layer is a polymer that includes a repeating unit derived from at least one monomer selected from the group consisting of alkyl acrylate, alkyl methacrylate, and styrene. From the above-described viewpoint, the number of carbon atoms in the alkyl group in the alkyl acrylate and the alkyl methacrylate is preferably 1 to 5 and more preferably 1 to 3.

As the polymer forming the polymer layer, from the viewpoint of further suppressing chips during cutting, an acrylic resin consisting of a combination of a repeating unit derived from the alkyl acrylate and a repeating unit derived from the alkyl methacrylate is preferable. In the acrylic resin, both of the content of the repeating unit derived from the alkyl acrylate and the content of the repeating unit derived from the alkyl methacrylate are preferably 20 to 80 mass % and more preferably 30 to 70 mass % with respect to all of the repeating units of the acrylic resin.

In particular, from the viewpoint of further suppressing chips during cutting, the total content of the repeating units derived from the alkyl acrylate and the alkyl methacrylate where the number of carbon atoms in the alkyl group is 1 to 5 is more preferably 60 to 100 mass % and still more preferably 75 to 100 mass % with respect to all of the repeating units of the acrylic resin.

In the adhesive polymer used in the sealing method, in a case where the solubility in the sealing solvent is higher, higher sealability can be obtained. In a case where the HSP value of the polymer is close to the HSP value of the sealing solvent, higher solubility can be ensured. Therefore, in a case where the hydrogen bond element and the polarity element in the HSP value of the polymer are represented by $dH_2$ and $d_P2$, respectively, the hydrogen bond element $dH_2$ is preferably 1.0 to 9.0, more preferably 2.0 to 8.0, and still more preferably 2.5 to 7.0. In addition, the polarity element $dP_2$ is preferably 1.0 to 9.0, more preferably 2.0 to 8.0, and still more preferably 2.5 to 7.0. In a case where the hydrogen bond element $dH_2$ and/or the polarity element $dP_2$ in the HSP value of the polymer is in the above-described range, the HSP value of the polymer is likely to be close to the HSP value of the sealing solvent, and the solubility of the polymer in the sealing solvent is high.

In particular, from the viewpoint of further improving sealability, a distance D in Hansen space is preferably 8.0 or less, more preferably 6.0 or less, and still more preferably 4.0 or less, the distance D being calculated using Expression (1) from the hydrogen bond element $dH_1$ and the polarity element $dP_1$ in the HSP value of the sealing solvent and the hydrogen bond element $dH_2$ and the polarity element $dP_2$ in the HSP value of the polymer in the polymer layer.

$$\text{Distance } D=\{(dH_1-dH_2)^2+(dP_1-dP_2)^2\}^{1/2} \quad (1)$$

The weight-average molecular weight (Mw) of the polymer is preferably 10000 to 150000 and more preferably 30000 to 100000.

In the present specification, unless specified otherwise, the weight-average molecular weight is a molecular weight measured using a gel permeation chromatograph (GPC) including columns TSKgel GMHxL, TSKgel G4000HxL, TSKgel G2000HxL, and/or TSKgel Super HZM-N (all of which are trade names manufactured by Tosoh Corporation) in terms of a polystyrene as a standard material in a tetrahydrofuran (THF) as a solvent that is detected using a differential refractometer.

As the polymer forming the polymer layer, one polymer may be used alone, or two or more polymers may be blended and used. In a case where the polymer layer is formed on the transparent support using a coating liquid including two or more polymers and a solvent described below, it is preferable that a usage ratio between the polymers is appropriately adjusted such that turbidity occurs in the film (polymer layer) after the solvent is volatilized.

The polymer layer may include components other than the polymer. Examples of the components other than the polymer that may be included in the polymer layer include a silane coupling agent, a thickener such as inorganic particles, a solvent, and a plasticizer.

The content of the polymer in the polymer layer is not particularly limited and is preferably 85 mass % or more and more preferably 90 mass % or more with respect to the total mass of the polymer layer. The upper limit may be 100 mass % or less and is preferably 99.99 mass % or less and more preferably 99.95 mass % or less.

In the polymer layer, the amount of the polymer with respect to the area of the surface of the transparent support is preferably about 1 to 50 g/m² and more preferably 7 to 25 g/m². In a case where the amount of the polymer is excessively small, the adhesiveness with a glass slide may decrease. In a case where the amount of the polymer is excessively large, the handleability of the cover film may deteriorate. In addition, as the thickness of the polymer layer decreases, the adhesiveness deteriorates, and the stress applied during cutting decreases. Therefore, blocking can be suppressed, and the formation of chips during cutting can be suppressed.

The thickness of the polymer layer is not particularly limited and, from the viewpoint of further improving the adhesiveness with a glass slide is preferably 1 μm or more and more preferably 10 μm or more. From the viewpoint of further improving the handleability of the cover film, the upper limit of the thickness of the polymer layer is preferably 40 μm or less and more preferably 30 μm or less. From the viewpoints of suppressing blocking and suppressing the formation of chips during cutting, the upper limit is preferably 20 μm or less and more preferably 15 μm or less.

A method of providing the polymer layer on the transparent support is not particularly limited, and examples thereof include application using a coater or a spray, casting, and transfer. In particular, it is preferable that, after applying a coating liquid in which the polymer is dissolved in a solvent to the transparent support, the coating film is dried to form the polymer layer.

As the kind of the solvent used in the coating liquid, a solvent in which the polymer is soluble and wettability is exhibited such that cissing on the substrate does not occur is preferably used. Examples of the solvent include toluene, ethyl acetate, butyl acetate, acetone, methyl ethyl ketone, and xylene.

In a case where a material that can dissolve the surface of the transparent support or a material that can elute a low molecular weight component such as a plasticizer in the transparent support is used as the solvent used in the coating liquid, the polymer penetrates the surface layer of the transparent support such that the adhesive strength between the polymer layer and the transparent support can be improved, and the peeling of the polymer layer can be prevented, and the formation of chips during cutting can be suppressed.

From the above-described viewpoint, it is preferable that the coating liquid used for forming the polymer layer includes a solvent selected from the group consisting of ethyl acetate and butyl acetate, and it is more preferable that the coating liquid includes ethyl acetate.

The content of the solvent selected from the group consisting of ethyl acetate and butyl acetate in the coating liquid is not particularly limited and, from the viewpoint of further suppressing the formation of chips during the cutting of the cover film, is preferably 40 mass % or more, more preferably 60 mass % or more, and still more preferably 70 mass % or more with respect to the total mass of the solvent in the coating liquid. The upper limit is not particularly limited and may be 100 mass % or less. From the viewpoint of further suppressing deformation of the substrate, the upper limit is preferably 90 mass % or less.

It is preferable to perform a drying step of applying the coating liquid including the polymer to the transparent support to form a coating film and drying the coating film to remove the solvent from the coating film.

Examples of the drying treatment in the drying step include a method (for example, natural drying) of leaving the coating film to stand at room temperature (23° C.) for a predetermined time, blast drying of blasting gas to the coating film, heating drying of heating the coating film using a heating unit such as an oven, and a combination thereof. In the drying step, it is preferable to perform at least one of blast drying or heating drying, and it is more preferable to perform a combination of blast drying and heating drying.

The temperature of the gas used in the blast drying is not particularly limited and is preferably 50° C. to 160° C. and more preferably 80° C. to 140° C. The speed (wind speed) of air flow in the blast drying is not particularly limited and is preferably 3 to 15 m/s and more preferably 5 to 10 m/s. The treatment time of the blast drying is preferably 0.5 to 5 minutes. Examples of the gas used in the blast drying include air and nitrogen.

<Silane Coupling Agent>

In the cover film, the polymer layer may include a silane coupling agent.

Here, the silane coupling agent refers to an organic silicon monomer having two or more different reactive groups in a molecule, in which at least one of the reactive groups is a reactive group that forms a chemical bond with an inorganic material and another one of the reactive groups is a reactive group that forms a chemical bond with an organic material.

It is preferable that the polymer layer includes a silane coupling agent. The reason for this is that the peeling of the cover film from the glass is suppressed even in a case where the cover film is bonded to a cover glass and is stored for a long period of time after sealing a sample in the cover film. This effect is significant particularly in the sealing method.

Even in a case where the cover film is stored in a roll shape or is laminated and stored, an effect of further suppressing blocking between the polymer layer and the support back surface can also be obtained.

Preferable examples of the silane coupling agent include a silane coupling agent represented by the following General Formula.

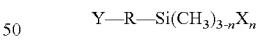

(In the formula, Y represents a vinyl group, a methacrylic group, an epoxy group, an amino group, a mercapto group, or a chloro group; R represents a single bond, a methylene group, a polymethylene group, or a polymethylene group in which at least one methylene group is substituted with O, S, or NH; X represents a chloro group, a methoxy group, an ethoxy group, a methoxyethoxy group, an acetoxy group, a methylvinyloxy group, or an amino group; and n represents 2 or 3)

Specific examples of the silane coupling agent include vinyltrichlorosilane, vinyltris(β-methoxyethoxy)silane, vinyltriethoxysilane, vinyl trimethoxysilane, γ-(methacryloxypropyl)trimethoxy silane, β-(3,4-epoxycyclohexyl)ethyltrimethoxysilane, γ-glycidoxypropyltrimethoxysilane, γ-glycidoxypropylmethyldiethoxysilane, N-β-(aminoethyl)-γ-aminopropyltrimethoxysilane, N-β-(aminoethyl)-γ-aminopropyl methyldimethoxysilane, β-aminopropyl triethoxysilane, N-phenyl-γ-aminopropyltrimethoxysilane, γ-mercaptopropyl trimethoxysilane, and γ-chloropropyl trimethoxysilane. Among these, γ-glycidoxypropyltrimethoxysilane, N-β-(aminoethyl)-γ-aminopropyl methyldimethoxysilane, N-β-(aminoethyl)-γ-aminopropyltrimethoxysilane, or γ-aminopropyl triethoxysilane is preferable, and γ-glycidoxypropyltrimethoxysilane or N-β-(aminoethyl)-γ-aminopropyl methyldimethoxysilane is more preferable.

It can be easily understood by those skilled in the art that the kind of the silane coupling agent used in the polymer layer is selected depending on the kind of an organic material to be bonded to glass, that is, the kind of the polymer forming the polymer layer.

A method of allowing the polymer layer to include the silane coupling agent is not particularly limited, and examples thereof include a first method of adding the silane coupling agent to a coating liquid for forming a polymer layer, applying the coating liquid including the polymer and the silane coupling agent to the transparent support, and drying the coating film, a second method of applying a coating liquid in which the silane coupling agent is dissolved in a solvent to the surface of the coating film or the polymer layer including the polymer that is formed on the transparent support and drying the coating film, and a third method of simultaneously applying (multilayer application) a coating liquid including the polymer and a coating liquid in which the silane coupling agent is dissolved in a solvent to the transparent support and drying the coating film.

From the viewpoint that the silane coupling agent can be effectively utilized with a small amount, the second method and the third method are preferable. The polymer layer including the silane coupling agent that is formed using the second method and the third method has a layer configuration where the first layer formed of the polymer and the second layer formed of the silane coupling agent are laminated. That is, the cover film that is formed using the second method and the third method has a layer configuration where the transparent support, the first layer formed of the polymer, and the second layer formed of the silane coupling agent are laminated in this order.

In addition, irrespective of any of the first to third methods, by performing the blast drying in the step of drying the coating film, an unevenness shape having a desired average height Rc can be formed on the surface of the polymer layer including the first layer and the second layer.

The solvent of the coating liquid in which the silane coupling agent is dissolved in the solvent that is used in the second method and the third method is not particularly limited as long as the silane coupling agent is soluble therein, and examples thereof include the solvents described above as the examples of the solvent in which the polymer is soluble. In particular, from the viewpoint of further improving the adhesiveness, ethyl acetate is preferable.

In a case where the polymer layer includes the silane coupling agent, the content of the silane coupling agent in the polymer layer is preferably 0.1 mg/m$^2$ or more and more preferably 5 to 25 mg/m$^2$ with respect to the surface area of the cover film.

The total film thickness of the polymer layer and the transparent support in the cover film is not particularly limited and is preferably 250 μm or less, more preferably 200 μm or less, and still more preferably 150 μm or less from the viewpoints of operability and microscopic properties during observation with a microscope. The lower limit is preferably 50 μm or more from the viewpoints of handleability such as breakage resistance and sealability.

The polymer layer may include a thickener. The kind of the thickener in the polymer layer is not particularly limited, and examples thereof include polysaccharides, celluloses, acryl, polyvinyl alcohol, a polymer compound such as diol or terpene, inorganic particles such as silica particles or titania particles, and organic particles consisting of a polymer such as PMMA. Among these, cellulose acetate (more preferably cellulose acetate butyrate or cellulose acetate phthalate) or silica particles are preferable.

From the viewpoint of suppressing bleed out (migration) of a hydrophilic material from a member in contact with the polymer layer, it is preferable that surfaces of the inorganic particles are treated to be hydrophobic.

The sizes of the inorganic particles and the organic particles are not particularly limited, and in a case where the sizes are excessively large, scattering is likely to occur, and microscopic properties may deteriorate. Therefore, an average secondary particle diameter of the inorganic particles (the average particle diameters of aggregates of the inorganic particles) is preferably 1 μm or less. The lower limit value is not particularly limited and may be 1 nm or more. The average secondary particle diameters of the inorganic particles and the organic particles can be measured using a dynamic light scattering method (nanoSAQLA, manufactured by Otsuka Electronics Co., Ltd.).

In addition, from the viewpoint of preventing scattering, it is preferable that the refractive indices of the inorganic particles and the organic particles are close to the refractive index of the polymer layer. More specifically, the refractive indices of the inorganic particles and the organic particles are preferably 1.40 to 1.60.

The polymer layer may include a plasticizer. By the polymer layer including the plasticizer, chips during cutting can be suppressed, and the brittleness of the polymer layer can be improved.

The plasticizer that may be included in the polymer layer is not particularly limited and, for example, is preferably selected from the group consisting of: a phosphate such as triphenyl phosphate, bisphenol A bis(diphenyl phosphate), trimethyl phosphate, triethyl phosphate, or diphenyl-2-methacryloylethyl phosphate; an adipic acid ester such as dioctyl adipate, dibutyl adipate, or diisobutyl adipate; a sebacic acid ester such as dioctyl sebacate; tris(2-ethylhexyl)trimellitate; dibutyl maleate; and glycerin triacetate.

In a case where the polymer layer includes the thickener and/or the plasticizer described above, the content of each of the thickener and the plasticizer is not particularly limited and, from the viewpoint of further exhibiting the effect of each of the additives, is preferably 0.5% or more, more preferably 1% or more, and still more preferably 3% or more with respect to the total mass of the polymer. In particular, from the viewpoint of further suppressing chips during cutting, the content of the thickener selected from the group consisting of the inorganic particles and the organic particles in the polymer layer is more preferably in the above-described range. The detailed mechanism in which the polymer layer includes the inorganic particles and/or the organic particles such that the formation of chips is suppressed is not clear but is presumed to be that the growth of cracks during cutting is suppressed due to the addition of the particle-shaped materials.

The upper limit of the content of each of the additives is not particularly limited and, from the viewpoint of the adhesiveness of the polymer layer, is preferably 20% or less, more preferably 15% or less, and still more preferably 10% or less with respect to the total mass of the polymer.

From the viewpoint of suppressing the blocking of the polymer layer in a case where the cover film is wound in a roll shape or is laminated and stored for a long period of time, the average height Rc of the surface of the polymer layer (hereinafter, also simply referred to as "average height Rc") is preferably 1.0 µm or more, more preferably 1.5 µm or more, and still more preferably 2.0 µm or more. By adjusting the average height Rc to be in the above-described range, the unevenness of the surface of the polymer layer increases, and the contact area of the surface of the polymer layer with another member decreases. Therefore, it is presumed that, even in a case where the cover film is wound in a roll shape or is laminated and stored for a long period of time, blocking is not likely to occur in the polymer layer.

The upper limit of the average height Rc is not particularly limited. However, in a case where the unevenness is large, the polymer layer is required to be thicker, and the total film thickness of the cover film increases. Therefore, in consideration of setting of a microscope and/or easy adjustment of a focal point, the upper limit of the average height Rc is preferably 10.0 µm or less and more preferably 3.5 µm or less.

In the present specification, "the surface" of the polymer layer refers to a surface of the polymer layer opposite to a surface facing the transparent support. In addition, the average height Rc of the surface of the polymer layer refers to an average height of a roughness profile element defined by JIS B0601:2013.

The average height Rc of the surface of the polymer layer can be measured by image analysis using a laser microscope. For example, regarding any five sections (length of 1056 µm) that are freely selected on the surface of the polymer layer, the average heights of unevenness in the sections are measured using "VK-9710") manufactured by Keyence Corporation, and the average height of the five sections is obtained. As a result, the average height Rc of the surface of the polymer layer is calculated.

A method of adjusting the average height Rc of the surface of the polymer layer is not particularly limited as long as it is a method of forming unevenness on the surface of the polymer layer. Examples of the method include a method of performing blast drying of blasting gas to the coating film in the step of applying the coating liquid in which the polymer is dissolved in the solvent to the transparent support and drying the coating film and a method of abutting a release film having unevenness on the surface against the coating film or the polymer layer to transfer the shape of the unevenness to the coating film or the polymer layer.

In a case where blast drying is performed on the coating film including the polymer that is formed on the transparent support, by appropriately adjusting conditions such as the temperature of the gas, the speed of the air flow, or the drying time depending on the kind of the polymer forming the polymer layer, the desired average height Rc, and the like, the average height Rc of the surface of the polymer layer in the cover film can be adjusted. For example, in a case where the temperature of the gas is excessively low, it may be difficult to form unevenness on the surface of the polymer layer. In a case where the temperature of the gas is excessively high, it may be difficult to maintain the unevenness shape formed on the surface. In addition, in a case where the speed of the air flow is excessively fast, the unevenness of the surface of the polymer layer, that is, the average height Rc tends to increase.

The temperature of heating drying is not particularly limited and is preferably 50° C. to 160° C. In addition, the heating time is preferably 0.5 to 5 minutes.

In addition, examples of a method of controlling the average height Rc of the surface of the polymer layer include a method of adjusting the viscosity of the coating liquid that is applied to the transparent support. The viscosity of the coating liquid can be adjusted depending on the content of the polymer in the coating liquid, the weight-average molecular weight (Mw) of the polymer in the coating liquid, the glass transition temperature (Tg) of the polymer layer, and the addition of the thickener.

From the viewpoint of improving the brittleness of the film in the polymer layer and suppressing the formation of chips during cutting of the cover film, the glass transition temperature Tg of the polymer layer is preferably 80° C. or lower, more preferably 70° C. or lower, and still more preferably 60° C. or lower.

On the other hand, the lower limit of the glass transition temperature Tg of the polymer layer is not particularly limited and, from the viewpoints that the viscoelasticity of the polymer layer decreases to suppress adhesiveness with another member and blocking resistance is further improved, is preferably 20° C. or higher and more preferably 45° C. or higher.

The glass transition temperature Tg of the polymer layer can be obtained by collecting a sample of the polymer layer from the cover film using a method such as peeling or scraping and subsequently measuring the obtained sample using a differential scanning calorimeter (DSC).

In addition, the glass transition temperature Tg of the polymer layer can be adjusted depending on the kind and the content ratio of the polymer forming the polymer layer described below.

In addition, for example, in order to prevent scratches on the surface of the cover film, to prevent blocking more reliably during storage in a very high temperature environment, or to obtain a curling balance of the cover film, a backing layer may be provided on a back surface (surface opposite to a surface where the polymer layer is provided) of the support.

Examples of a material for forming the backing layer include a synthetic polymer having a high glass transition temperature such as polystyrene or polymethyl methacrylate and gelatin.

It is preferable that a microscopic sample is prepared using the sealing method. The sealing method can be preferably applied particularly to preparation of a sample in a microscope including an automatic sealing machine.

The sealing method is not limited to the preparation of the sample and can be applied to, for example, sealing of a thin film on a substrate or protection of an underlayer by laminating. In addition, the substrate that is bonded to the cover film may be glass or a film-shaped material (for example, a resin).

EXAMPLES

Hereinafter, the present invention will be described in more detail using examples. However, the present invention is not limited to the following examples as long as it does not depart from the scope of the present invention. Unless specified otherwise, "part(s)" and "%" represent "part(s) by mass" and "mass %".

[Preparation of Cover Film A]
(Synthesis of Polymer)

At 80° C. in a nitrogen atmosphere, a mixed solution of 60 parts by mass of ethyl acrylate, 150 parts by mass of methyl methacrylate, 90 parts by mass of cyclohexyl methacrylate, 98 parts by mass of toluene, 66 parts by mass of ethyl acetate, and 1.8 parts by mass of azoisobutyronitrile was added to a mixture of 38 parts by mass of toluene and 25 parts by mass of ethyl acetate for 2 hours. Next, the obtained mixed solution was caused to react for 2 hours while being maintained at 80° C. Next, 1.0 parts by mass of azoisobutyronitrile was added to the mixed solution, and a polymerization reaction was performed at 90° C. to form a polymer having a predetermined weight-average molecular weight. Next, by adding 78 parts by mass of ethyl acetate to the mixed solution, a polymer solution 1 including the polymer was obtained. The weight-average molecular weight Mw of the obtained polymer was 70000.

(Preparation of Coating Liquid)

118 parts by mass of toluene and 560 parts by mass of ethyl acetate were mixed with 608 parts by mass of the polymer solution 1 to obtain a polymer layer coating liquid 1. A ratio of ethyl acetate to all of the solvents in the polymer layer coating liquid 1 was 74 mass %.

Further, 109.89 parts by mass of ethyl acetate was added to 0.11 parts by mass of a silane coupling agent KBM403 (γ-glycidoxypropyltrimethoxysilane, manufactured by Shin-Etsu Chemical Co., Ltd.) to obtain a silane coupling agent coating liquid 1.

(Preparation of Cover Film)

The polymer layer coating liquid 1 and the silane coupling agent coating liquid 1 were applied using a multi-layer extrusion application method to a substrate (transparent support, refractive index: 1.481) consisting of transparent triacetate cellulose (TAC) having a thickness of 118 μm to form a coating film. The application amount of the polymer layer coating liquid 1 was an amount adjusted such that the dry film thickness was 19 μm, and the application amount of the silane coupling agent coating liquid 1 was an amount adjusted such that the application concentration of the silane coupling agent with respect to the area of the surface of the transparent support was 13.5 mg/m².

A blast drying treatment of blasting hot air at 100° C. to the formed coating film at a wind speed of 3.2 m/s for 2 minutes in a drying step, and subsequently a heating drying treatment of heating the coating film using an oven at 100° C. for 6 minutes is performed. As a result, a cover film A consisting of the transparent support and the polymer layer including the silane coupling agent layer on the surface side was prepared. The total film thickness of the transparent support and the polymer layer in the cover film A was 137 μm.

[Preparation of Cover Film B]

A polymer solution 2 including the polymer was prepared using the same method as that of the cover film A, except that 150 parts by mass of methyl methacrylate and 150 parts by mass of butyl methacrylate were used instead of 60 parts by mass of ethyl acrylate, 150 parts by mass methyl methacrylate, and 90 parts by mass of cyclohexyl methacrylate during the preparation of the polymer solution. The weight-average molecular weight Mw of the polymer in the polymer solution 2 was 70000.

A cover film B was prepared using the same method as that of the cover film A, except that the polymer solution 2 was used instead of the polymer solution 1 to prepare a polymer layer coating liquid 2 and the obtained polymer layer coating liquid 2 was used instead of the polymer layer coating liquid 1. The total film thickness of the transparent support and the polymer layer in the cover film B was 137 μm.

[Preparation of Cover Film C]

A polymer solution 3 including the polymer was prepared using the same method as that of the cover film A, except that 60 parts by mass of ethyl acrylate, 120 parts by mass of methyl methacrylate, and 120 parts by mass of butyl methacrylate were used instead of 60 parts by mass of ethyl acrylate, 150 parts by mass methyl methacrylate, and 90 parts by mass of cyclohexyl methacrylate during the preparation of the polymer solution. The weight-average molecular weight Mw of the polymer in the polymer solution 3 was 70000.

A cover film C was prepared using the same method as that of the cover film A, except that the polymer solution 3 was used instead of the polymer solution 1 to prepare a polymer layer coating liquid 3 and the obtained polymer layer coating liquid 3 was used instead of the polymer layer coating liquid 1. The total film thickness of the transparent support and the polymer layer in the cover film C was 137 μm.

[Preparation of Cover Film D]

A polymer solution 4 including the polymer was prepared using the same method as that of the cover film A, except that 117 parts by mass of ethyl acrylate and 183 parts by mass of methyl methacrylate were used instead of 60 parts by mass of ethyl acrylate, 150 parts by mass methyl methacrylate, and 90 parts by mass of cyclohexyl methacrylate during the preparation of the polymer solution. The weight-average molecular weight Mw of the polymer in the polymer solution 4 was 70000.

A cover film D was prepared using the same method as that of the cover film A, except that the polymer solution 4 was used instead of the polymer solution 1 to prepare a polymer layer coating liquid 4 and the obtained polymer layer coating liquid 4 was used instead of the polymer layer coating liquid 1. The total film thickness of the transparent support and the polymer layer in the cover film D was 137 μm.

[Preparation of Cover Film E]

A polymer solution 5 including the polymer was prepared using the same method as that of the cover film A, except that 60 parts by mass of ethyl acrylate, 120 parts by mass of methyl methacrylate, 60 parts by mass of cyclohexyl methacrylate, and 60 parts by mass of butyl methacrylate were used instead of 60 parts by mass of ethyl acrylate, 150 parts by mass methyl methacrylate, and 90 parts by mass of cyclohexyl methacrylate during the preparation of the polymer solution. The weight-average molecular weight Mw of the polymer in the polymer solution 5 was 70000.

A cover film E was prepared using the same method as that of the cover film A, except that the polymer solution 5 was used instead of the polymer solution 1 to prepare a polymer layer coating liquid 5 and the obtained polymer layer coating liquid 5 was used instead of the polymer layer coating liquid 1. The total film thickness of the transparent support and the polymer layer in the cover film E was 137 μm.

[Preparation of Cover Film F]

A polymer solution 6 including the polymer was prepared using the same method as that of the cover film A, except that 300 parts by mass of ethyl acrylate was used instead of 60 parts by mass of ethyl acrylate, 150 parts by mass methyl methacrylate, and 90 parts by mass of cyclohexyl methacrylate during the preparation of the polymer solution. The weight-average molecular weight Mw of the polymer in the polymer solution 6 was 70000.

A cover film F was prepared using the same method as that of the cover film A, except that the polymer solution 6 was used instead of the polymer solution 1 to prepare a polymer layer coating liquid 6 and the obtained polymer layer coating liquid 6 was used instead of the polymer layer coating liquid 1. The total film thickness of the transparent support and the polymer layer in the cover film F was 137 μm.

[Preparation of Cover Film G]

A polymer solution 7 including the polymer was prepared using the same method as that of the cover film A, except that 300 parts by mass of 2-hydroxy methacrylate was used instead of 60 parts by mass of ethyl acrylate, 150 parts by mass methyl methacrylate, and 90 parts by mass of cyclohexyl methacrylate during the preparation of the polymer solution. The weight-average molecular weight Mw of the polymer in the polymer solution 7 was 70000.

A cover film G was prepared using the same method as that of the cover film A, except that the polymer solution 7 was used instead of the polymer solution 1 to prepare a polymer layer coating liquid 7 and the obtained polymer layer coating liquid 7 was used instead of the polymer layer coating liquid 1. The total film thickness of the transparent support and the polymer layer in the cover film G was 137 μm.

[Preparation of Cover Film H]

A cover film H was prepared using the same method as that of the cover film A, except that the polymer layer coating liquid 1 was applied using a single layer application method to form a coating film instead of applying the polymer layer coating liquid 1 and the silane coupling agent coating liquid 1 using the extrusion multilayer application method. The total film thickness of the transparent support and the polymer layer in the cover film H was 137 μm.

[Preparation of Cover Film I]

A polymer solution 8 including the polymer was prepared using the same method as that of the cover film A, except that 60 parts by mass of ethyl acrylate, 150 parts by mass of methyl methacrylate, and 90 parts by mass of butyl methacrylate were used instead of 60 parts by mass of ethyl acrylate, 150 parts by mass methyl methacrylate, and 90 parts by mass of cyclohexyl methacrylate during the preparation of the polymer solution. The weight-average molecular weight Mw of the polymer in the polymer solution 8 was 70000.

By dispersing silica particles ("Aerosil NX90S", manufactured by EVONIK) with ultrasonic waves in ethyl acetate to adjust the concentration, a silica-containing liquid 1 where the content of silica particles having an average secondary particle diameter of 0.2 μm was 5 mass % was prepared.

During the preparation of the polymer layer coating liquid, 118 parts by mass of toluene, 275 parts by mass of ethyl acetate, and 1300 parts by mass of the silica-containing liquid were added to and mixed with 608 parts by mass of the polymer solution 8, a polymer layer coating liquid 8 was prepared. A ratio of ethyl acetate to all of the solvents in the polymer layer coating liquid 8 was 74 mass %.

A cover film I was prepared using the same method as that of the cover film A, except that the obtained polymer layer coating liquid 8 was used instead of the polymer layer coating liquid 1. The total film thickness of the transparent support and the polymer layer in the cover film I was 137 μm.

Example 1

(Sealing Work)

A glass slide that was dipped in 2-methoxy-1-methylethyl acetate as a previous dipping solvent in advance was pulled up from a dipping bath, 0.07 ml of 2-methoxy-1-methylethyl acetate was added dropwise to the glass slide, and the cover film A was caused to reciprocate halfway from the glass slide at 0.05 MPa and bonded to the glass slide.

(Evaluation)

During and after the sealing work, the following evaluation was performed.

<Sealability>

10 minutes after completion of the sealing work, the bonded cover film was observed, peeling of the cover film from the glass slide and bubbles were checked, and the sealability was evaluated based on the following standards.

1: both of peeling and bubbles did not occur.
2: a very small amount of peeling and/or bubbles occurred.
3: a small amount of peeling and/or bubbles occurred.
4: a certain amount of peeling and/or bubbles occurred.
5: a large amount of peeling and/or bubbles occurred.

<Odor>

Regarding the odor of the solvent during the sealing work, sensory evaluation was performed based on the following standards.

1: the odor is weak.
2: the odor is stronger than 1 and weaker than 3.
3: the odor is slightly strong.
4: the odor is strong.
5: the odor is quite strong.

<Quick Drying Properties>

An adhesive was dried after the completion of the sealing work, a period of time (drying time) required until the cover film did not move was measured, and the quick drying properties were evaluated based on the following standards.

1: the drying time was 3 minutes or shorter.
2: the drying time was longer than 3 minutes and 5 minutes or shorter.
3: the drying time was longer than 5 minutes and 10 minutes or shorter.
4: the drying time was longer than 10 minutes and 15 minute or shorter.
5: the drying time was longer than 15 minutes.

<Aging Storability>

The bonded sample was left to stand in an environment of 40° C. and 80% RH for 7 days, and a film peeling acceleration test was performed. After the acceleration test, the cover film was observed by visual inspection, and the aging storability was evaluated from the following standards based on whether or not bubbles and/or peeling increased.

1: an increase in bubbles and peeling was not observed.
2: a very small increase in bubbles and/or peeling was observed.
3: a small increase in bubbles and/or peeling was observed.
4: an increase in bubbles and/or peeling was observed.
5: a large increase in bubbles and/or peeling was observed.

Examples 2 to 21 and Comparative Examples 1 to 3

The sealing test and each of the evaluations were performed using the same method as that of Example 1, except that the previous dipping solvent, the sealing solvent, and/or the cover film was changed as shown in Table 1 below.

In the following table, the column "Kind" of "Cover Film" shows the cover film used in each of Examples and Comparative Examples, and the column "Hansen Solubility Parameter" of "Cover film" shows the Hansen solubility parameter (HSP value) of the polymer forming the polymer layer in each of the cover films.

The column "Silane Coupling Agent" shows the silane coupling agent used for forming the silane coupling agent layer in each of Examples and Comparative Examples, in which "None" is shown in a case where the silane coupling agent layer was not formed.

The column "Distance D" shows the distance D on Hansen space that was calculated using Expression (1) from the hydrogen bond element $dH_1$ and the polarity element $dP_1$ in the HSP value of the sealing solvent used in Examples and Comparative Examples and the hydrogen bond element $dH_2$ and the polarity element $dP_2$ in the HSP value of the polymer in the polymer layer.

TABLE 1

| | | | Example 1 | Example 2 | Example 3 | Example 4 |
|---|---|---|---|---|---|---|
| | Previous Dipping Solvent | | Same as Sealing Solvent | Same as Sealing Solvent | Same as Sealing Solvent | Same as Sealing Solvent |
| Sealing Solvent | Kind of Solvent | | 2-Methoxy-1-Methylethyl Acetate | Butyl Acetate | Propyl Acetate | Methyl Isobutyl Ketose |
| | Hansen Solubility Parameter | Hydrogen Bond Element dH1 | 6.6 | 6.2 | 6.5 | 5.7 |
| | | Polarity Element dP1 | 5.5 | 4.7 | 5.2 | 3.9 |
| | Boiling Point (C.) | | 146 | 126 | 102 | 116.2 |
| Cover Film | Kind | | A | A | A | B |
| | Hansen Solubility Parameter | Hydrogen Bond Element dH2 | 5.6 | 5.6 | 5.6 | 6.4 |
| | | Polarity Element dP2 | 3.2 | 3.2 | 3.2 | 4.4 |
| | Silane Coupling Agent | | KBM403 | KBM403 | KBM403 | KBM403 |
| | Distance D | | 2.5 | 1.6 | 2.2 | 0.9 |
| Evaluation | Sealability | | 1 | 1 | 1 | 1 |
| | Odor | | 1 | 1 | 2 | 2 |
| | Quick Drying Properties | | 3 | 2 | 1 | 2 |
| | Aging Storability | | 1 | 1 | 1 | 1 |
| | | | Example 5 | Example 6 | Example 7 | Example 8 |
| | Previous Dipping Solvent | | Same as Sealing Solvent | Same as Sealing Solvent | Same as Sealing Solvent | Same as Sealing Solvent |
| Sealing Solvent | Kind of Solvent | | Dioxane | 1-Methoxy-2-Propanol | 2-Methoxy-1-Methyethyl Acetate | 2-Methoxy-1-Methyethyl Acetate |
| | Hansen Solubility Parameter | Hydrogen Bond Element dH1 | 9.0 | 12.5 | 6.6 | 6.6 |
| | | Polarity Element dP1 | 1.8 | 7.5 | 5.5 | 5.5 |
| | Boiling Point (C.) | | 101 | 119 | 146 | 146 |
| Cover Film | Kind | | B | B | C | D |
| | Hansen Solubility Parameter | Hydrogen Bond Element dH2 | 6.4 | 6.4 | 5.5 | 6.9 |
| | | Polarity Element dP2 | 4.4 | 4.4 | 3.1 | 3.2 |
| | Silane Coupling Agent | | KBM403 | KBM403 | KBM403 | KBM403 |
| | Distance D | | 3.7 | 6.8 | 2.6 | 2.3 |
| Evaluation | Sealability | | 2 | 3 | 1 | 1 |
| | Odor | | 2 | 1 | 1 | 1 |
| | Quick Drying Properties | | 1 | 2 | 3 | 3 |
| | Aging Storability | | 1 | 1 | 1 | 1 |

TABLE 2

|  |  |  | Example 9 | Example 10 | Example 11 | Example 12 |
|---|---|---|---|---|---|---|
| Sealing Solvent | Previous Dipping Solvent | | Same as Sealing Solvent | Same as Sealing Solvent | Same as Sealing Solvent | Same as Sealing Solvent |
| | Kind of Solvent | | 2-Methoxy-1-Methyethyl Acetate | 2-Methoxy-1-Methyethyl Acetate | 2-Methoxy-1-Methyethyl Acetate | 2-Methoxy-1-Methyethyl Acetate |
| | Hansen Solubility Parameter | Hydrogen Bond Element dH1 | 6.6 | 6.6 | 6.6 | 6.6 |
| | | Polarity Element dP1 | 5.5 | 5.5 | 5.5 | 5.5 |
| | Boiling Point (C.) | | 146 | 146 | 146 | 146 |
| Cover Film | Kind | | D | F | G | H |
| | Hansen Solubility Parameter | Hydrogen Bond Element dH2 | 5.5 | 7.7 | 13.2 | 5.6 |
| | | Polarity Element dP2 | 3.1 | 6.2 | 7.1 | 3.2 |
| | Silane Coupling Agent | | KBM403 | KBM403 | KBM403 | |
| | Distance D | | 2.6 | 1.3 | 6.8 | 2.5 |
| Evaluation | Sealability | | 1 | 3 | 4 | 1 |
| | Odor | | 1 | 1 | 1 | 1 |
| | Quick Drying Properties | | 3 | 3 | 3 | 3 |
| | Aging Storability | | 1 | 1 | 1 | 3 |

|  |  |  | Example 13 | Example 14 | Example 15 | Example 16 |
|---|---|---|---|---|---|---|
| Sealing Solvent | Previous Dipping Solvent | | Same as Sealing Solvent | Same as Sealing Solvent | Amyl Acetate | Same as Sealing Solvent |
| | Kind of Solvent | | Amyl Acetate | Amyl Acetate | 1,3,5-Trimethylbenzene | Cyclopentyl Methyl Ether |
| | Hansen Solubility Parameter | Hydrogen Bond Element dH1 | 5.8 | 5.8 | 3.1 | 3.9 |
| | | Polarity Element dP1 | 4.3 | 4.3 | 2.9 | 3.5 |
| | Boiling Point (C.) | | 149 | 149 | 164 | 106 |
| Cover Film | Kind | | A | I | I | A |
| | Hansen Solubility Parameter | Hydrogen Bond Element dH2 | 5.6 | 5.7 | 5.7 | 5.6 |
| | | Polarity Element dP2 | 3.2 | 3.3 | 3.3 | 3.2 |
| | Silane Coupling Agent | | KBM403 | KBM403 | KBM403 | KBM403 |
| | Distance D | | 1.1 | 1.0 | 2.6 | 1.7 |
| Evaluation | Sealability | | 1 | 1 | 1 | 1 |
| | Odor | | 2 | 2 | 2 | 1 |
| | Quick Drying Properties | | 3 | 3 | 4 | 1 |
| | Aging Storability | | 1 | 1 | 1 | 1 |

TABLE 3

|  |  |  | Example 17 | Example 18 | Example 19 | Example 20 |
|---|---|---|---|---|---|---|
| Sealing Solvent | Previous Dipping Solvent | | Same as Sealing Solvent | Cyclopentyl Methyl Ether | Same as Sealing Solvent | Same as Sealing Solvent |
| | Kind of Solvent | | Cyclopentyl Methyl Ether | 1,3,5-Trimethylbenzene | 1,3,5-Trimethylbenzene | 1,3,5-Trimethylbenzene |
| | Hansen Solubility Parameter | Hydrogen Bond Element dH1 | 3.9 | 3.1 | 3.1 | 3.1 |
| | | Polarity Element dP1 | 3.5 | 2.9 | 2.9 | 2.9 |
| | Boiling Point (C.) | | 106 | 164 | 164 | 164 |

TABLE 3-continued

| Cover Film | Kind | I | I | A | I |
|---|---|---|---|---|---|
| | Hansen Solubility Parameter | Hydrogen Bond Element dH2 | 5.7 | 5.7 | 5.6 | 5.7 |
| | | Polarity Element dP2 | 3.3 | 3.3 | 3.2 | 3.3 |
| | Silane Coupling Agent | | KBM403 | KBM403 | KBM403 | KBM403 |
| | Distance D | | 1.8 | 2.6 | 2.5 | 2.6 |
| Evaluation | Sealability | | 1 | 1 | 1 | 1 |
| | Odor | | 1 | 1 | 1 | 1 |
| | Quick Drying Properties | | 1 | 4 | 4 | 4 |
| | Aging Storability | | 1 | 1 | 1 | 1 |

| | | | Example 21 | Comparative Example 1 | Comparative Example 2 | Comparative Example 3 |
|---|---|---|---|---|---|---|
| | Previous Dipping Solvent | | 1,3,5-Trimethylbenzene | Same as Sealing Solvent | Same as Sealing Solvent | Same as Sealing Solvent |
| Sealing Solvent | Kind of Solvent | | 1,3,5-Trimethylbenzene | Limonene | Ethyl Acetate | 2-Propanol |
| | Hansen Solubility Parameter | Hydrogen Bond Element dH1 | 3.9 | 4.3 | 7.2 | 16.4 |
| | | Polarity Element dP1 | 3.5 | 1.8 | 5.3 | 6.1 |
| | Boiling Point (C.) | | 106 | 176 | 77.1 | 82.5 |
| Cover Film | Kind | | I | A | A | A |
| | Hansen Solubility Parameter | Hydrogen Bond Element dH2 | 5.7 | 5.6 | 5.6 | 5.6 |
| | | Polarity Element dP2 | 3.3 | 3.2 | 3.2 | 3.2 |
| | Silane Coupling Agent | | KHM403 | KBM403 | KBM403 | KBM403 |
| | Distance D | | 1.8 | 1.9 | 2.6 | 11.2 |
| Evaluation | Sealability | | 1 | 2 | 1 | 5 |
| | Odor | | 1 | 1 | 5 | 3 |
| | Quick Drying Properties | | 1 | 5 | 1 | 1 |
| | Aging Storability | | 1 | 1 | 1 | 1 |

It was found from the results of Table 1 that, in the sealing method satisfying the requirements of the present invention, the odor is weak, the sealability is high, and the quick drying properties are higher.

In addition, cover films were prepared using the same methods as those of Examples 1 to 11 and 13 to 21, respectively, except that the same amount of toluene, the same amount of ethyl acetate, and an amount of the mixed solution of the silane coupling agent adjusted such that the application concentration was the same as that in a case where the silane coupling agent coating liquid was applied were added and mixed to prepare a silane coupling agent-containing polymer layer coating liquid instead of adding toluene and ethyl acetate to each of the polymer solution and the single layer application of the silane coupling agent-containing polymer layer coating liquid was performed instead of the multilayer application of the polymer layer coating liquid and the silane coupling agent coating liquid in (Preparation of Cover Film), and the sealing test was performed using each of the cover films. In this case, it was verified that the same performance as that of Examples 1 to 11 and 13 to 21 was exhibited.

What is claimed is:

1. A sealing method for sealing a subject between a substrate and a cover film including a polymer layer provided on a transparent support comprising:

disposing a sealing solvent between the substrate and the cover film, and laminating the cover film on a surface of the substrate on which the subject is placed such that a surface of the cover film on the polymer layer side faces the substrate, to bond the substrate and the cover film to each other, wherein the sealing solvent is a solvent including at least one kind selected from the group consisting of an ester having a boiling point of 80° C. to 170° C., an alcohol having a boiling point of 80°° C. to 170° C., a ketone having a boiling point of 80° C. to 170° C., an ether having a boiling point of 80° C. to 170° C., and an aromatic hydrocarbon having a boiling point of 150° C. to 170° C., a hydrogen bond element $dH_1$ in a Hansen solubility parameter of the sealing solvent is 2.5 to 15.0, and a polarity element $dP_1$ in the Hansen solubility parameter of the sealing solvent is 0.5 to 8.0.

2. The sealing method according to claim 1, wherein a polymer in the polymer layer includes a repeating unit derived from at least one monomer selected from the group consisting of ethyl acrylate, n-butyl acrylate, methyl acrylate, cyclohexyl acrylate, benzyl acrylate, ethyl methacrylate, n-butyl methacrylate, isobutyl methacrylate, t-butyl methacrylate, methyl methacrylate, cyclohexyl methacrylate, benzyl methacrylate, acetoacetoxy alkyl methacrylate, styrene, and dimethylacrylamide.

3. The sealing method according to claim 2,
wherein the polymer in the polymer layer consists of a repeating unit derived from at least one monomer selected from the group consisting of ethyl acrylate, n-butyl acrylate, methyl acrylate, cyclohexyl acrylate, benzyl acrylate, ethyl methacrylate, n-butyl methacrylate, isobutyl methacrylate, t-butyl methacrylate, methyl methacrylate, cyclohexyl methacrylate, benzyl methacrylate, acetoacetoxy alkyl methacrylate, styrene, and dimethylacrylamide.

4. The sealing method according to claim 1,
wherein the polymer layer includes a silane coupling agent.

5. The sealing method according to claim 4,
wherein the silane coupling agent is selected from γ-glycidoxypropyltrimethoxysilane or N-β-(aminoethyl)-γ-aminopropyl methyldimethoxysilane.

6. The sealing method according to claim 1,
wherein the sealing solvent includes at least one selected from the group consisting of ethyl propionate, amyl acetate, propyl acetate, isopropyl acetate, butyl acetate, methyl lactate, dimethyl carbonate, 1-butanol, 1-propanol, 2-butanol, 1-pentanol, 2-pentanol, isoamyl alcohol, t- amyl alcohol, neopentyl alcohol, cyclopentanol, 2-hexanol, 4-methyl-2-pentanol, methyl isobutyl ketone, acetylacetone, cyclopentanone, n-butyl ether, 1,2-dimethoxyethane, dioxane, cyclopentyl methyl ether, 1-methoxy-2-propanol, 2-methoxy-1-methylethyl acetate, and 1,3,5- trimethylbenzene.

7. The sealing method according to claim 1,
wherein a hydrogen bond element $dH_2$ in a Hansen solubility parameter of a polymer in the polymer layer is 2.5 to 7.0, and
a polarity element $dP_2$ in the Hansen solubility parameter of the polymer in the polymer layer is 2.5 to 7.0.

8. The sealing method according to claim 1,
wherein a refractive index of the transparent support is 1.460 to 1.560.

9. The sealing method according to claim 1,
wherein a material for forming the transparent support is triacetate cellulose.

10. The sealing method according to claim 1,
wherein a thickness of the transparent support is 50 to 150 um.

11. The sealing method according to claim 1,
wherein a total film thickness of the polymer layer and the transparent support is 150 μm or less.

12. The sealing method according to claim 1,
wherein a distance D in Hansen space is 8.0 or less, the distance D being calculated using Expression (1) from a hydrogen bond element $dH_1$ and a polarity element $dP_1$ in a Hansen solubility parameter of the sealing solvent and a hydrogen bond element $dH_2$ and a polarity element $dP_2$ in a Hansen solubility parameter of a polymer in the polymer layer, $$D=\{(dH_1-dH_2)^2+(dP_1-dP_2)^2\}^{1/2} \qquad (1).$$

* * * * *